United States Patent [19]

Maier et al.

[11] Patent Number: 5,005,689

[45] Date of Patent: Apr. 9, 1991

[54] STORAGE SYSTEM

[75] Inventors: Dieter Maier, Stuttgart; Dieter Boley, Leonberg/Eltingen, both of Fed. Rep. of Germany

[73] Assignee: Fraunhofer Gesellschaft zur Förderung der angewandten Forschung e.V., Munich, Fed. Rep. of Germany

[21] Appl. No.: 549,637

[22] Filed: Jul. 6, 1990

Related U.S. Application Data

[63] Continuation of Ser. No. 474,634, Jan. 30, 1990, abandoned, which is a continuation of Ser. No. 160,210, Feb. 25, 1988, abandoned.

[30] Foreign Application Priority Data

Feb. 27, 1987 [DE] Fed. Rep. of Germany ....... 3706493

[51] Int. Cl.$^5$ ................................................. B65G 1/00
[52] U.S. Cl. .................. 198/347.3; 198/750; 198/434
[58] Field of Search ............ 198/347.3, 350, 434, 198/750, 803.14; 414/416, 417

[56] References Cited

U.S. PATENT DOCUMENTS

| | | | |
|---|---|---|---|
| 1,925,502 | 9/1933 | Schaeffer | 198/434 |
| 2,575,278 | 11/1951 | Kearney | 198/803.14 |
| 3,878,933 | 4/1975 | Bauer et al. | 198/350 |
| 4,475,643 | 10/1984 | Klingenberg | 198/347 |
| 4,509,634 | 4/1985 | Payne | 198/347 |

FOREIGN PATENT DOCUMENTS 3438123 4/1986 Fed. Rep. of Germany ...... 198/347

Primary Examiner—Joseph E. Valenza
Attorney, Agent, or Firm—Kalish & Gilster

[57] ABSTRACT

Described is a storage system for sequent and positioned input, storage and removal of items arranged on a carrier. The storage system is provided with a first container for full carriers and a second container for empty carriers. The carrier is a conveyor belt, the ends of which are attached to shafts arranged one in the first container and one in the second container, respectively, and which can be rolled up on these shafts together with the items on the conveyor belt. A forward transport unit moves the conveyor belt in such a manner that a new item can be stored or removed from one loading and unloading station and the conveyor belt is unwound from one shaft and rewound on the other shaft. The system has the advantage that it requires only one loading and unloading station and that the process can be readily automated.

20 Claims, 9 Drawing Sheets

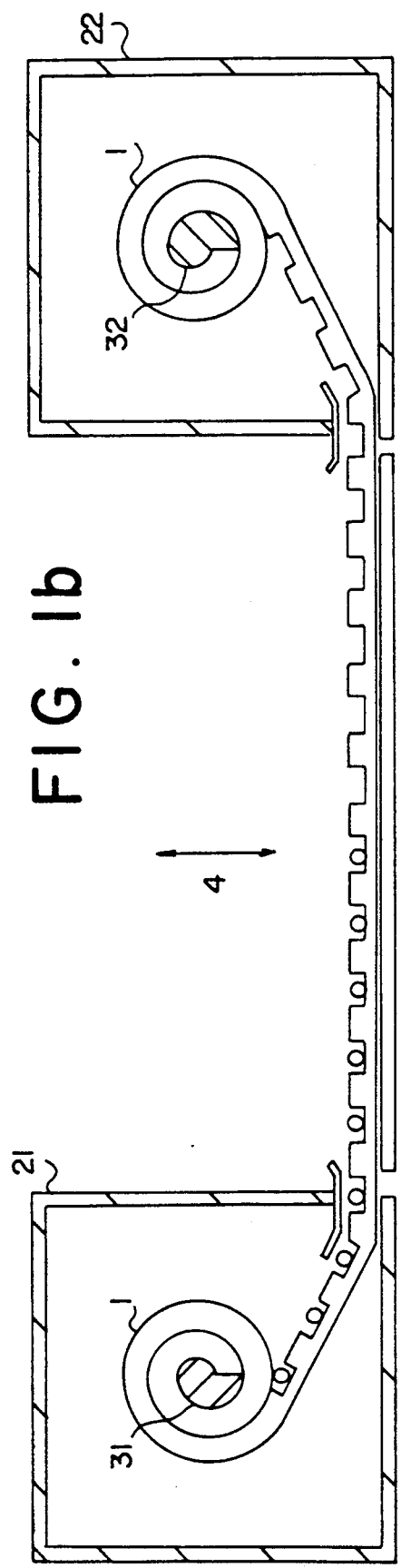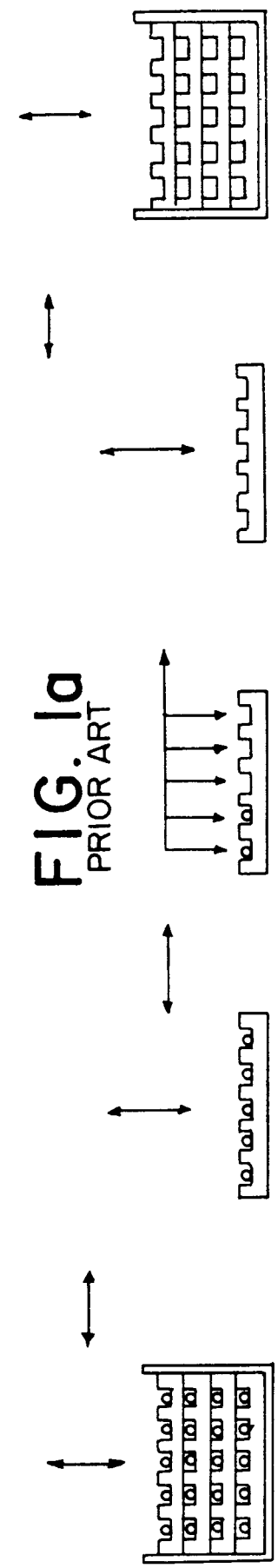

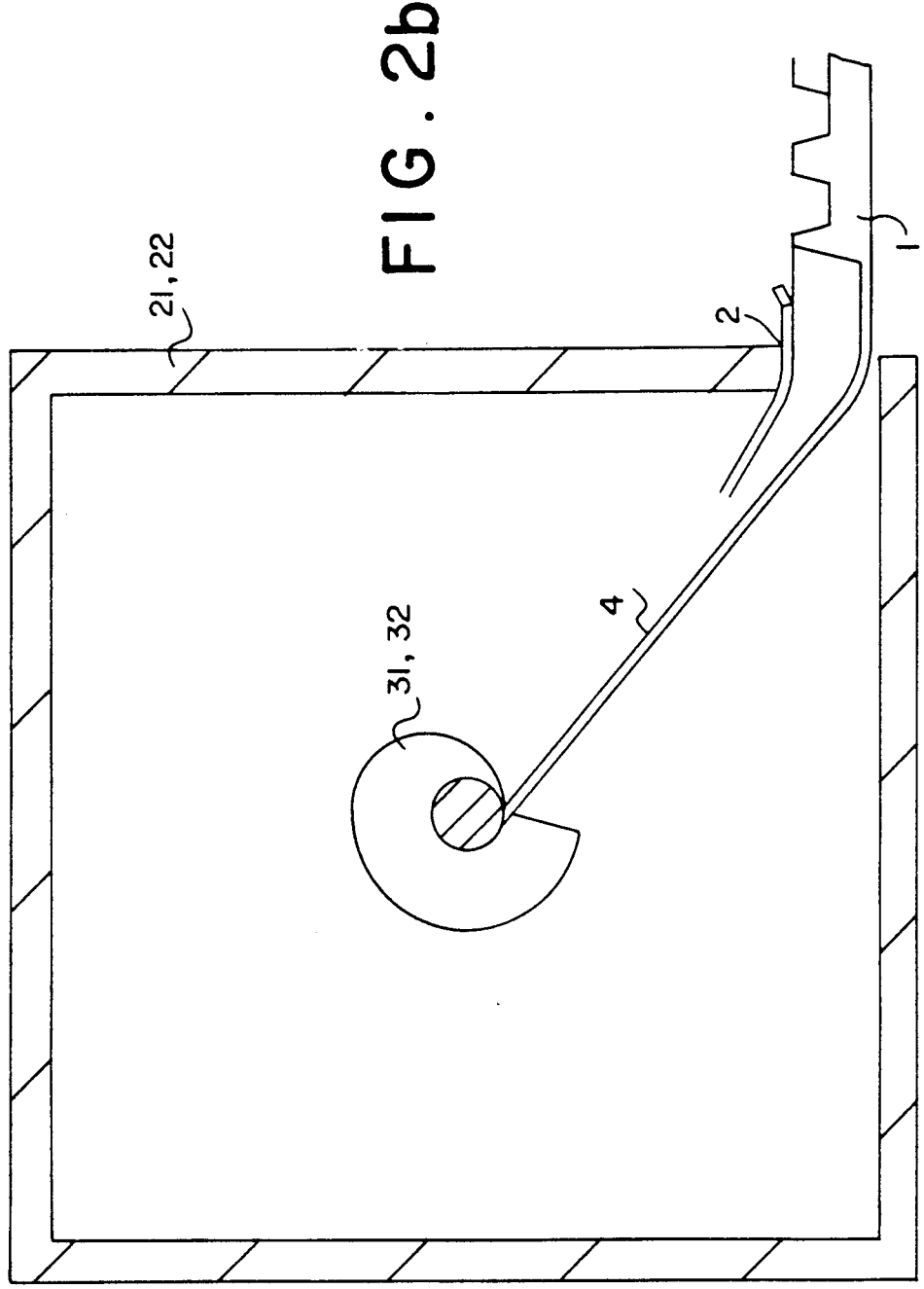

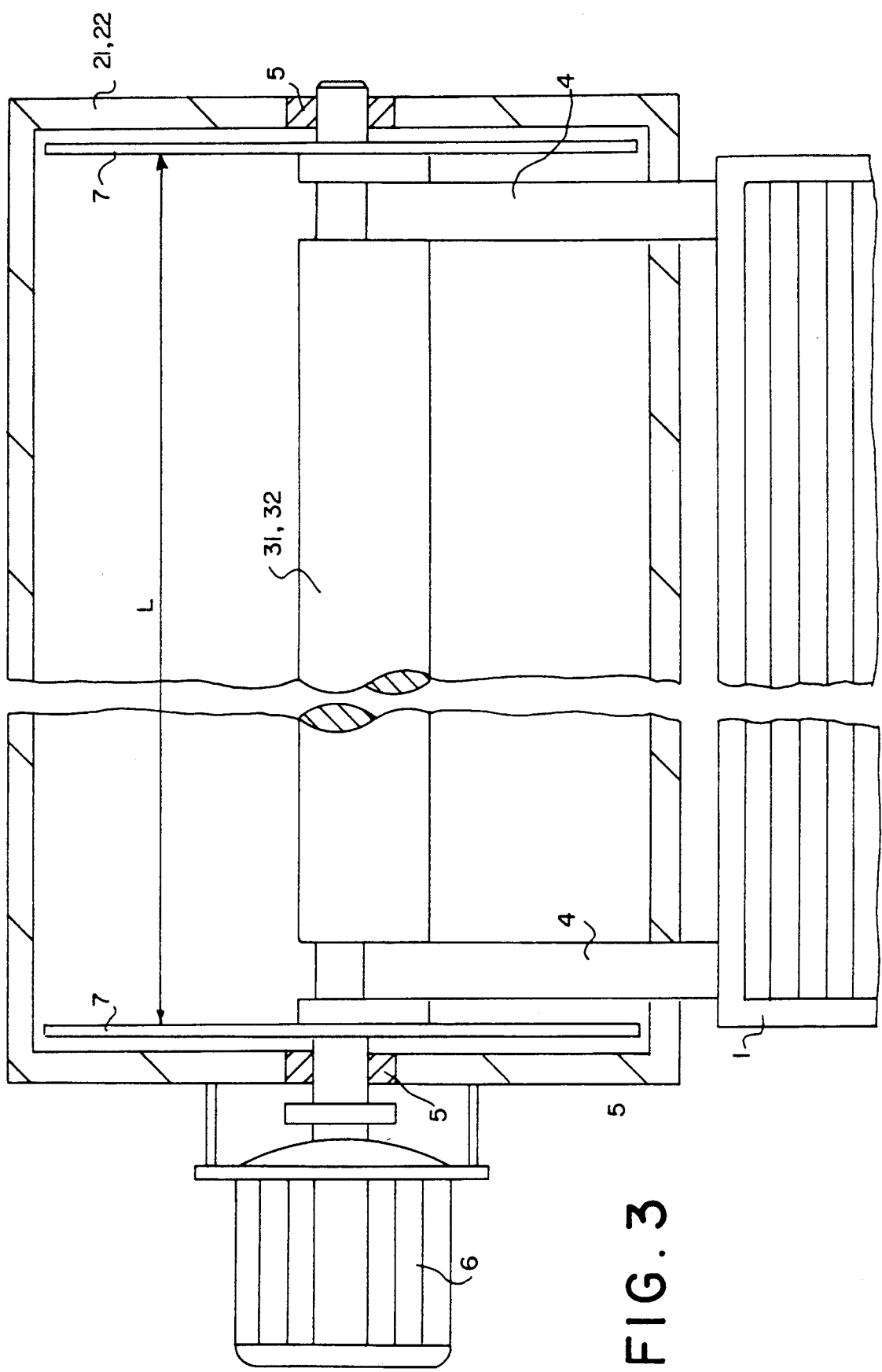

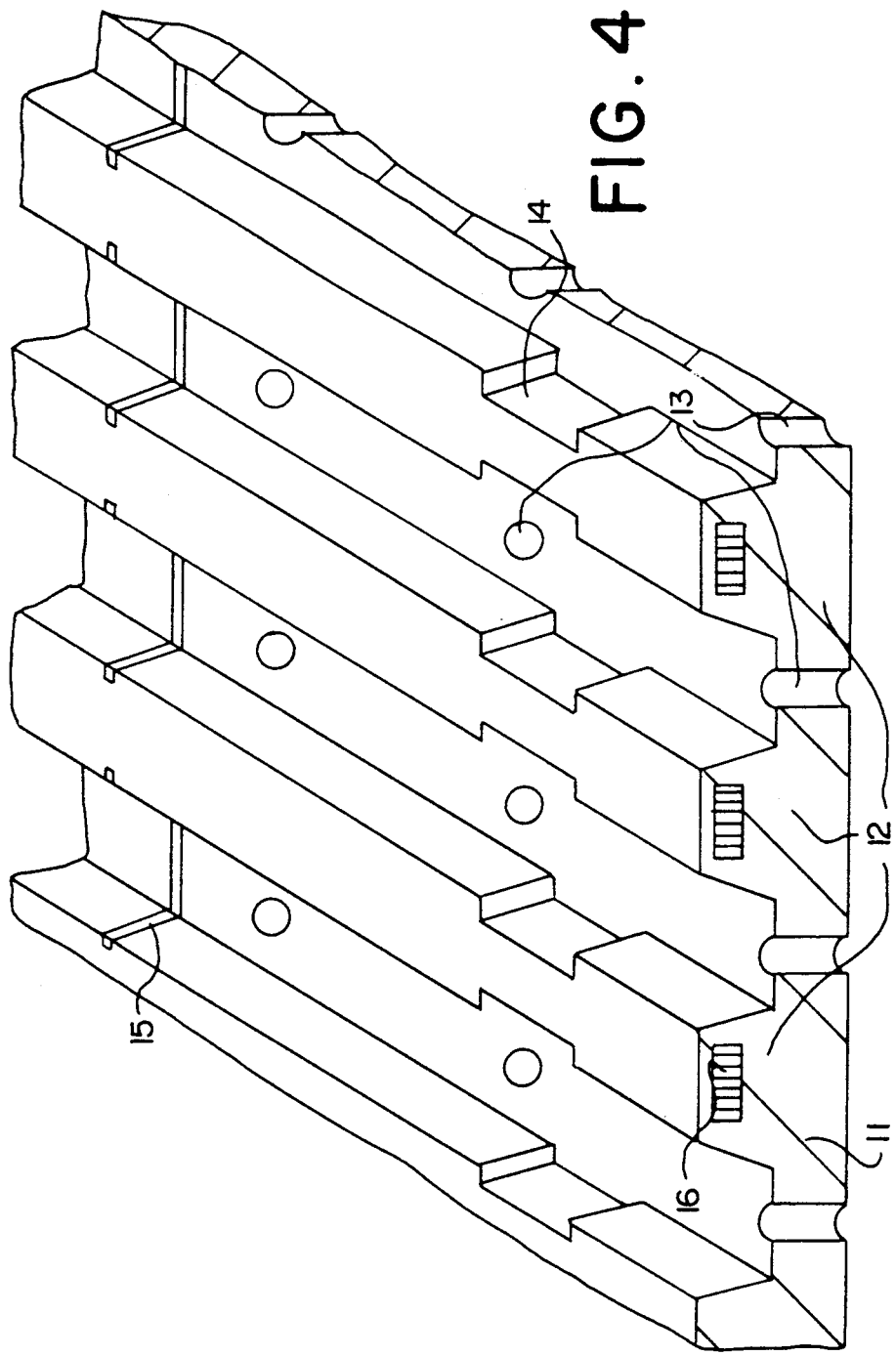

STORAGE SYSTEM

CROSS-REFERENCE TO RELATED APPLICATION

This application is a continuation of Ser. No. 07/474,634 filed Jan. 30, 1990, now abandoned, which is a continuation of application Ser. No. 07/160,210 filed Feb. 25, 1988, now abandoned, in which priority is claimed under German application P No. 37 06 493.2, filed Feb. 27, 1987.

The present invention relates to a storage system for a sequent, positioned input, storage and removal of items arranged on a carrier.

Storage systems of this type are suitable for storing items of any kind, in particular, however, for storing pliable, limp items as well as brittle and fragile ones and those having sensitive surfaces.

In prior art storage systems the items are, by way of illustration, accommodated on pallets, which for their part are stacked on top of each other in a container.

For this reason, in order to remove items, it is necessary to remove one pallet after the other from the container, process the removed pallet in order of its position and put the empty pallet, by way of illustration, into another container. When the items are to be put in, the task is reversed.

The prior art storage systems are, therefore, only suitable to a limited extent for automatic loading and removal, by way of illustration, with a handling device: both removal of the pallets from the container and processing the pallets requires changing the position of the handling device according to the size of the pallet and the items as well as of the number of pallets in the container. Thus the loading and the removal processes require complex and variable motions, so that an automatically run operation is, by way of illustration, hardly feasible to process the pallets on which items of different size and/or kind are stored without complex identification systems.

The object of the present invention is to provide a storage system for sequent, positioned input, storage and removal of items arranged on a carrier, in which input and removal of the stored items can be easily automated.

A solution of this object in accordance with the present invention is described together with embodiments thereof in the patent claims hereto.

An inventive element it that the carrier employed is not a pallet but a conveyor belt which is wound from one roll to another for putting items into the storage system or removing them. Between the two rolls is the loading or unloading station, where items are removed from the conveyor belt or put on it.

In this manner, one single loading/unloading station suffices for the invented storage system. Moreover, the invented storage system has the advantage that the unwinding of the "roll" and the immediate rewinding into another "roll" only requires the most rudimentary rotary motions.

The invented storage system thus has a number of advantages over conventional storage systems:

The invented storage system only needs a single loading or and unloading station, thus, the invented storage system requires no complex motions for putting items into and removing items from the storage system.

Moving the conveyor belt forward and rewinding it require only the most rudimentary rotary motions.

The invented storage system is also suitable for storing items of different sizes for all the items can be put in and removed from the same place regardless of their size.

In each roll, the item to be stored is flexibly enveloped by the conveyor belt or the underside of the wound part of the conveyor belt above it in such a manner that the items to be stored are protected.

It is, of course, also possible to simply lay the items to be stored unsequent or individually on the conveyor belt and to secure them there by means of, by way of illustration, "Velcro", adhesive tapes, etc.

Particularly advantageous, however, is the variant according to which the conveyor belt is provided with extrusions or a pronounced contour, the shape of which is adapted to the outline of the items to be stored standing broadside to the conveyor belt. In this construction, the invented storage system is particularly suitable for storing pliable, limp items having a length that is much greater than their cross-section as well as storing brittle and/or fragile items and ones having sensitive surfaces for the invented storage system has rigid storage sites, which at least partially envelope the item to be stored.

A further embodiment is set forth, in which the conveyor belt has a simple modular construction, having the particular advantage that by exchanging the mounted modular prop, the roll storage system can be easily adapted to any desired items to be stored. Such further embodiment has the additional advantage that each storage site is in itself rigid in such a manner that, in particular, brittle or fragile items can be safely stored.

Advantageous embodiments of the drive mechanism for the entire roll storage system are set forth. Particularly advantageous is placing the drive mechanism in the loading/unloading station as this further reduces the amount of space required by the storage system and ensures timed forward transportby one storage site at a time with simple means.

Loading and unloading the storage system is further facilitated by means of a precise curving of the conveyor belt in the region of the loading and unloading station, which can be created by the moving system itself.

A further embodiment ensures that the items can only be put on and removed from the conveyor belt from one place, but also guarantees protection of the items as there is access to only one single item at a time.

set forth herein ensure that the roll, which is being unwound, is always kept taut.

Further features which ensure that the roll stays round in order that possible damage to the items to be stored is avoided with certainty during winding and unwinding.

Moreover, the invented storage system is always advantageous when sensitive objects are to be handled as the objects are not only enveloped individually by the conveyor belt, but the entire roll—in contrast to the pallet containers—is also always accommodated in an enclosed container. Additional protection for the stored items is achieved by a further embodiment described.

The invented storage system is particularly suitable for modular construction, in which the containers of the storage system can be removed from the actual storage system following putting items to be stored in or removing them and can be replaced by full or empty containers.

Further embodiments, substantially simplify the removal process.

Described are measures which permit universal application of the invented storage system, further simplify its loading and unloading and, moreover, permit storing very different items and precise access to these items.

The present invention is made more apparent in the following with the use of further embodiments and with reference to the attached drawings, in which:

FIG. 1a shows a conventional storage system of the same type as the present invention.

FIG. 1b shows an invented roll storage system,

FIG. 2b shows a roll of the invented storage system in an unwound state,

FIG. 3 shows a cross-section of a roll container

FIG. 4 shows an invented conveyor belt, and

FIG. 1a depicts a prior art storage system of the same type as the present invention, in which pallets are stored one above the other in a container. In order to remove the items, first one full pallet has to be removed from the container; subsequently the removed pallet has to be processed and accommodated in another container for empty pallets.

Figure 2A:
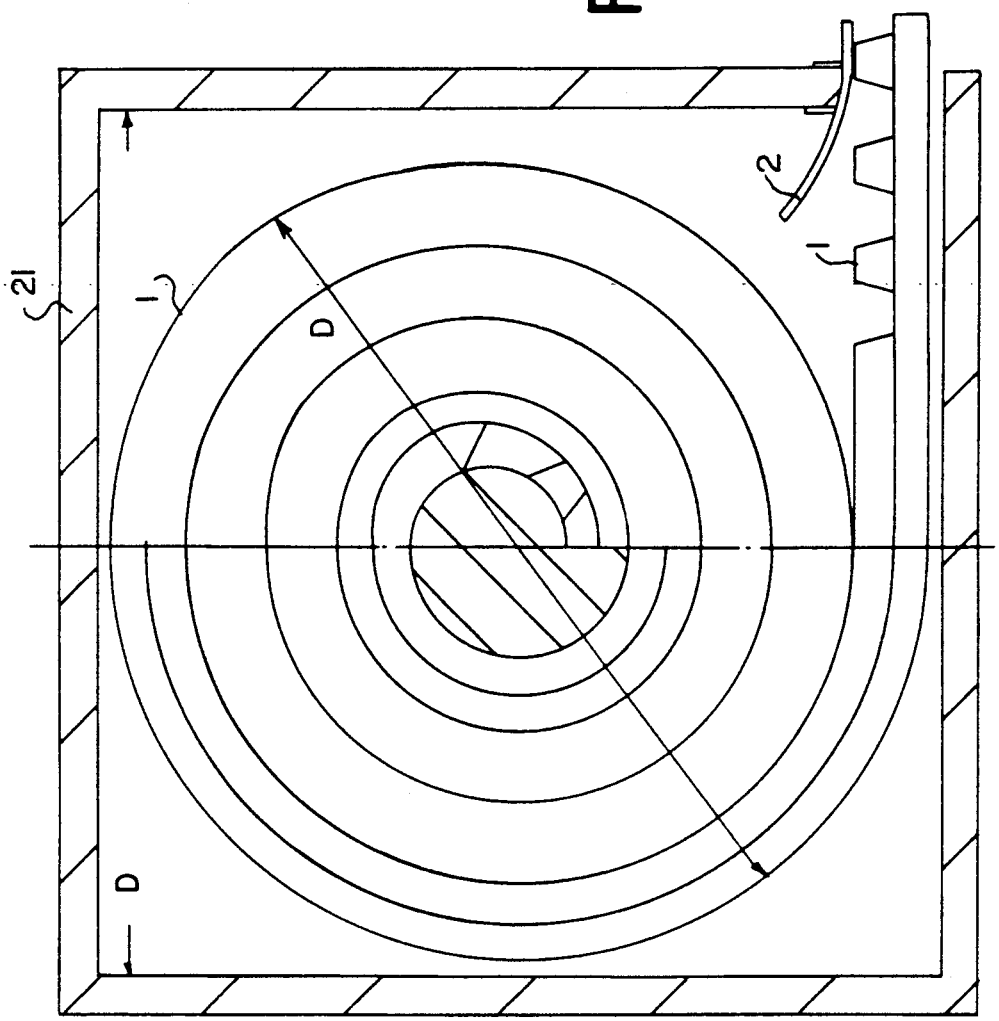
FIG. 2a shows a roll of the invented storage system in a fully wound state.

Thus—as already described in the introduction—a series of complicated motions is required.

On the other hand, the invented roll storage system depicted in FIG. 1b only requires the most rudimentary rotary motions by which the conveyor belt is wound on one roll and off the other.

For this purpose, the invented storage system is provided with a conveyor belt 1, the ends of which are attached to shafts 31 or 32, one arranged in a first container 21 and one in a second container 22, respectively. By winding conveyor belt 1 onto shaft 32 and corresponding unwinding it from shaft 31, the conveyor belt is moved past a loading or unloading station, which is not illustrated herein in more detail and is symbolized by an arrow 4, in such a manner that loading and unloading of the conveyor belt can ensue from a fixed place without requiring variable positioning of the unit to be removed.

FIG. 2a and 2b depict a container, by way of illustration, container 21, with a "full roll", i.e. a wound and with an unwound conveyor belt 1. It can be plainly seen that the shafts, in this case shaft 31, have a "spiral-shaped cross-section", resulting in a round roll. In order to be able to move the conveyor belt completely out of the container, it is advantageous, if the conveyor belt 1 is attached to shaft 31 via a roll-out band 4, which "bridges" the distance between the opening for the conveyor belt and shaft 31. Furthermore, in the opening in the container for the conveyor belt, there is arranged a guide 2, which prevents the stored items from falling out.

FIG. 3 depicts a cross-section of a container of the invented roll storage system. Shaft 31 or 32 is borne in the side walls of container casing 21 or 22 by means of bearing 5 and is driven by means of an motor 6. Furthermore, More, it can be seen that guide surfaces 7 are provided, which ensure an even winding of conveyor belt 1, which—as depicted—is attached to shaft 31 by means of roll-out bands 4.

In the following, the individual elements of the present invention will be made more apparent.

The frame of container 21 may, by way of illustration be constructed modularly, i.e. intermediary elements may be provided in order to adapt its length L and its with to a special product spectrum.

Shaft 31 has—as previously described—a spiral-shaped cross-section in order that a round "roll" of the conveyor belt 1 is yielded. Roll-out bands 4 are attached in two recesses in shaft 31 in such a manner that the conveyor belt 1 can run completely out of the container and, on the other hand, the roll-out bands 4 do not interfere with the shape of the roll.

Guide surfaces 7 at the ends of the shaft not only ensure guidance of the roll, but also close off the storage sites laterally in such a manner that the stored items cannot shift.

Motor 6 is—as will be illustrated in connection with FIG. 5a and 5b—only an auxiliary motor, which has the function to turn in the opposite direction of the roll direction when the roll is being unwound and to keep the roll taut; when the roll is being wound, auxiliary motor 6, on the other hand, turns in the direction of the roll and, thus, holds the roll line.

In this connection auxiliary motor 6 is to be construed in such a manner that the function of holding taut can be overcome by the timed forward transport, which is yet to be described.

FIG. 4 partially depicts a cutaway of a conveyor belt 1. The conveyor belt 1 is composed of a suitable, elastic carcass 11 and mounted modular props 12, whereby the geometric shape of the modular props and the carcass bandmay be selected to fit the task. Borings 13 are provided at suitable intervals in the elastic belt carcass, in which, by way of illustration, the pins of the timed forward transport unit can mesh, which will be described in more detail in connection with FIG. 5.

Modular props 12 as well as, if necessary, the elastic belt carcass 11 are provided with recesses 14 in order that, by way of illustration, a grab arm can envelope the items. Furthermore, grooves 15 are provided, which, by way of illustration, permit the insertion of partitions in order to be able to safely store items, which are shorter than the conveyor belt width L.

Figure 5B:
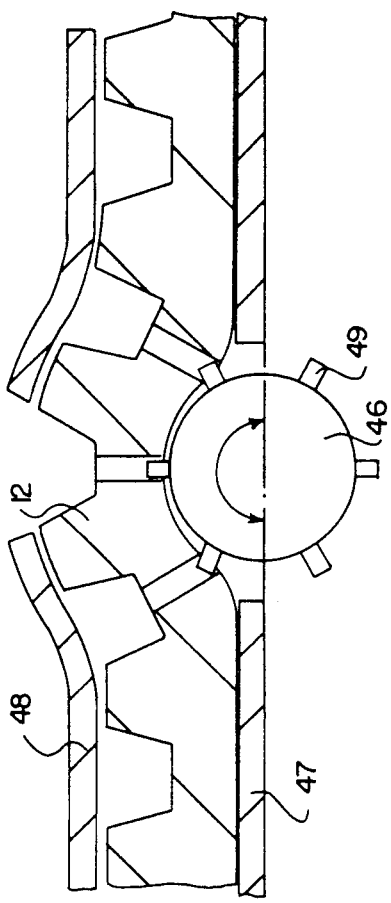
FIG. 5a and 5b show two embodiments of an invented timed forward transport unit
Figure 5A:
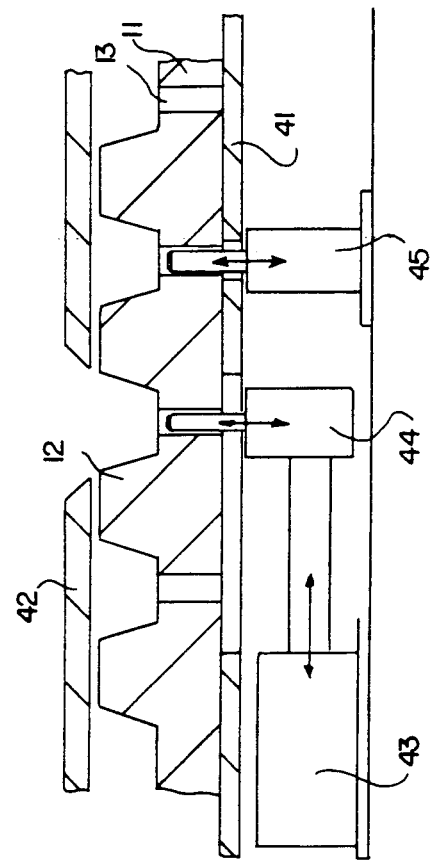

FIG. 5a and 5b depict two possible variants of the timed forward transport unit. In the variant shown in FIG. 5a, the timed forward transport unit is composed of a base plate 41, a cover plate 42, having an opening, which permits removal of one single object; a forward transport runner 43, a retractable pin 44 and a locking pin 45. In order to execute a timed forward transport, the retractable pin 44 drives into boring 13; then runner 43 moves forward by one measured stretch, locking pin 45 drives into the conveyor belt and fixes the belt. Pin 44 drives out of boring 13 again and runner 43 returns.

In the drive variant illustrated in FIG. 5b, belt carcass 11 runs over a drum 46, which is provided in a recess of a base plate 47. Furthermore, a counter plate 48 is provided, which follows the contour of the conveyor belt and has an opening, which again only permits removal of one single item. In this drive variant, the conveyor belt is always in mesh with the pins 49 of the timed forward transport unit, the timed forward transport ensues via a simple to realize turning motion.

Figure 6A:
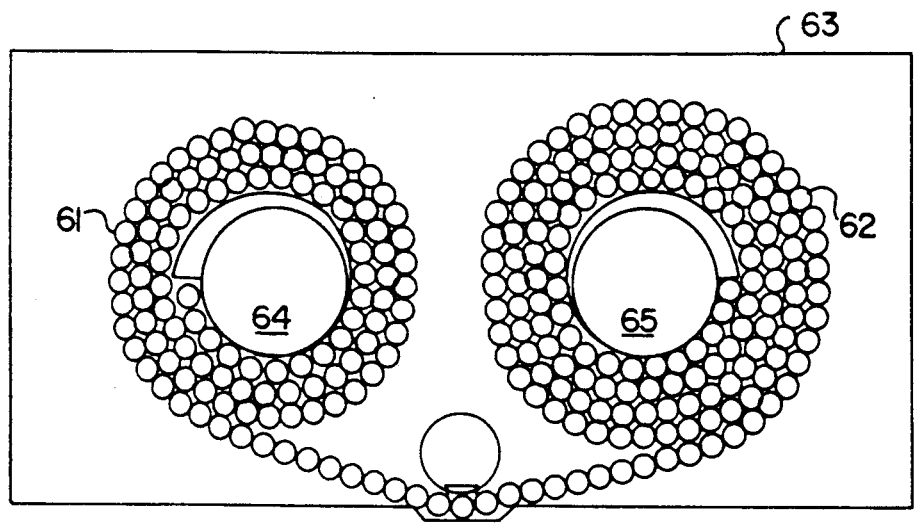
FIG. 6a and 6b show two embodiments of an invented roll storage system with a joint container constructed like a cassette.
Figure 6B:
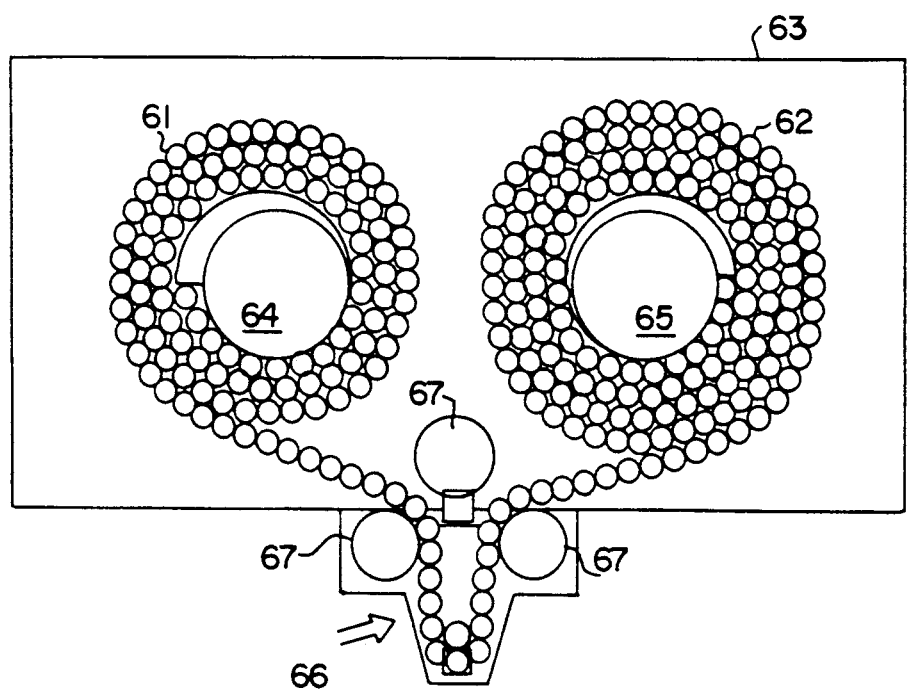

FIG. 6a and 6b depict a further embodiment of an invented storage system, in which a cassette 63 is provided instead of two containers, accommodating rolls 61 and 62. Shafts 64 and 65 are fixed in cassette 63. Contrary to the embodiment shown in FIG. 6a, the embodiment illustrated in FIG. 6b has the loading and unloading station 66 arranged outside of the cassette by means of several guide rollers 67.

In the embodiment depicted in FIG. 7, in contrast to the embodiments presented in FIG. 6a and 6b, shafts 64 and 65 of the two rolls 61 and 62 are not fixed, but are arranged on flexible levers 71 and 72 in such a manner that they can be moved. By this means the available storage volume is better exploited, as illustrated in FIGS. 8a and 8b. Moreover, FIG. 8a shows that with certain outer dimensions, which are indicated in the figures, by way of illustration, with 80 ME (measuring units) and 120 ME, rolls 61 and 62, having a diameter of 56 ME would already overlap if shafts 64 and 65 were arranged in such a manner that the biggest possible diameter is 80 ME. In the embodiment presented in FIG. 8b, in which shafts 64 and 65 are arranged in such a manner that they can be moved by means of flexible levers 71 and 72, there is room in the cassette 63 for two rolls with a diameter of 56 ME.

Figure 7A:
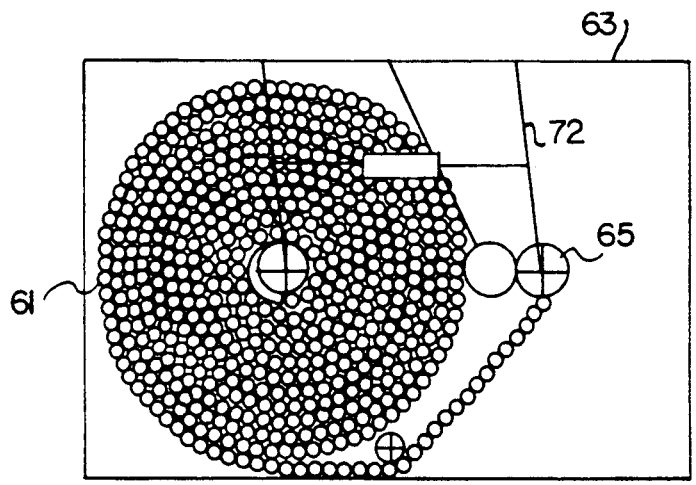
FIG. 7a to 7c show a further embodiment, having flexible suspended shaft bearings
Figure 7B:
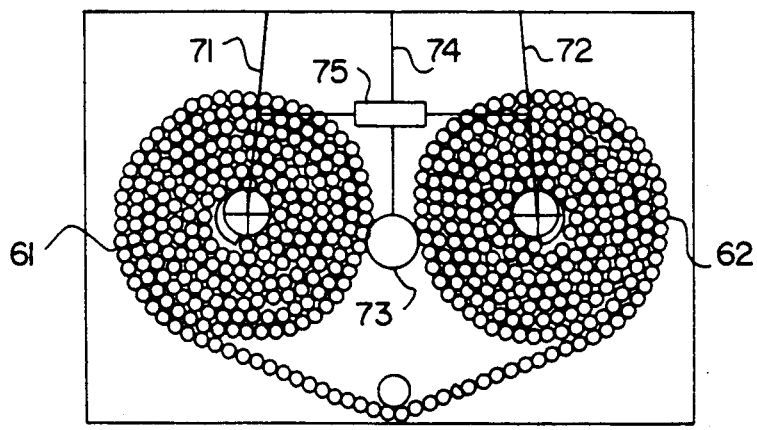
Figure 7C:
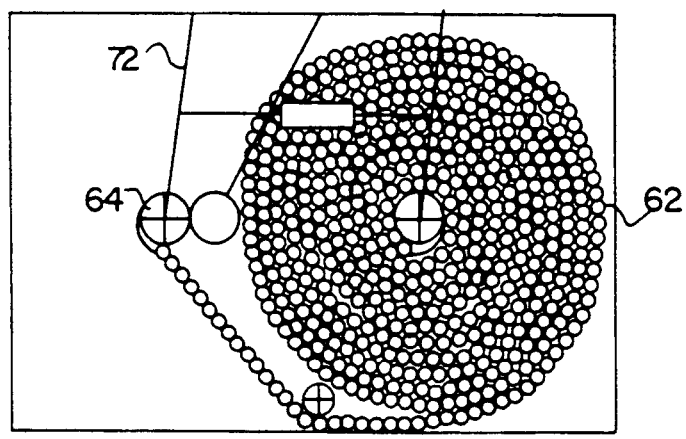
Figure 8A:
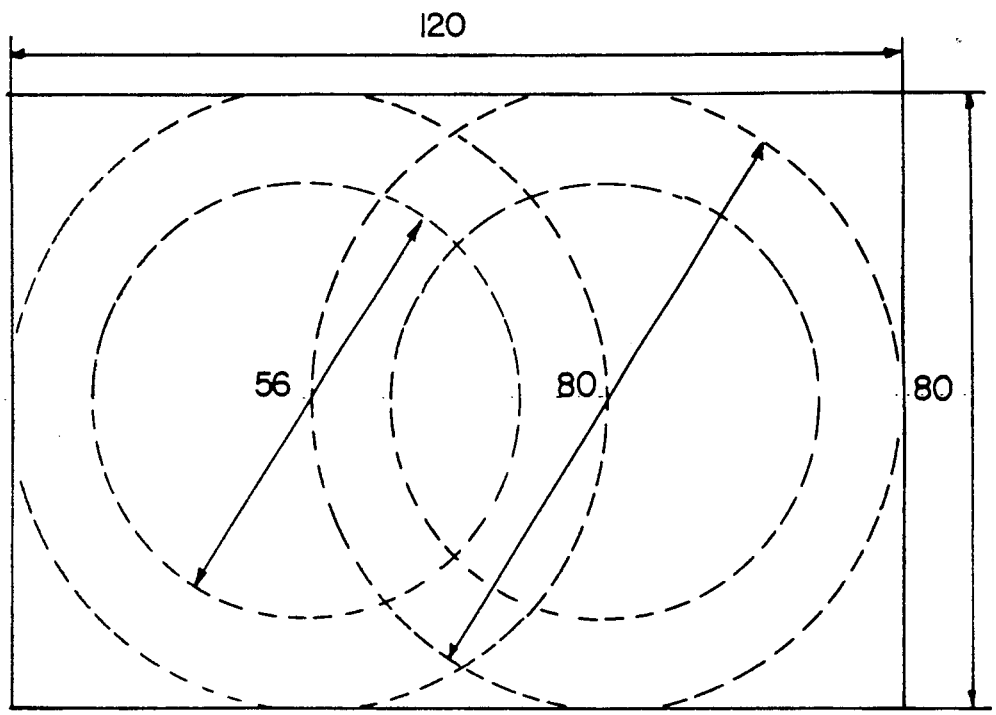
FIG. 8a and 8b show a comparison of the storage volume.
Figure 8B:
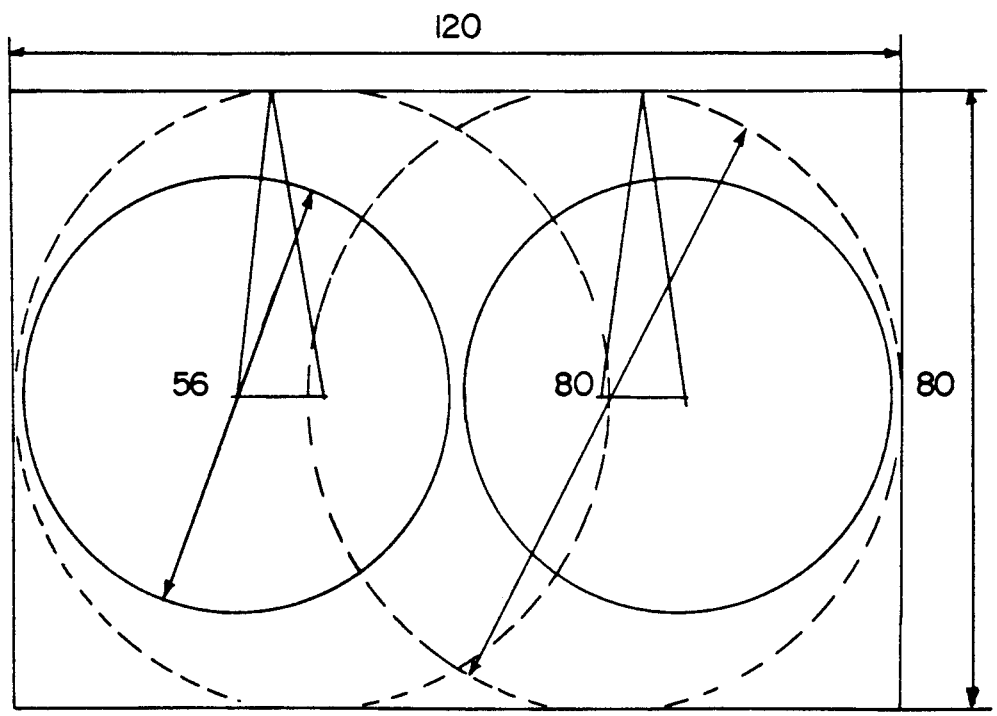

Furthermore, in FIGS. 7a to 7c, a brake element is provided in the form of roller 73, which, in the case of flexible, suspended shafts, adjusts the peripheral velocity of the two rolls to each other during winding or unwinding in such a manner permitting even winding and unwinding of the individual rolls. For this purpose, brake element 73 is also borne on a flexible lever or crossarm 74, which is connected via a spring 75 to the two flexible levers or bearing rods 71 and 72 of rolls 61 and 62.

The "cassette storage system" depicted in FIGS. 6 to 8 has the additional advantage that easy transport is possible, by way of illustration, with a forklift or a ground conveyor vehicle. Moreover, due to the closed unit, only minimum preparation time for operation is required. Unloading or loading the storage system may preferably ensue by means of turning the storage system and gravity.

Furthermore, it is possible to operate the storage system horizontally as well as vertically. Moreover, the storage system may be turned upside down in such a manner that the last entered items are given out first. In addition, the conveyor belt may be composed of pipe-like objects, in which axially symmetrical items can be stacked on top of each other.

Putting in and removing items can ensue by means of active sliders or gripping devices. The drive elements for moving the rolls can also be coupled to the cassette from the outside. In another embodiment, the individual cassettes can also be constructed in such a manner that they can be stacked.

The present invention has been made more apparent in the preceeding section using embodiments thereof without the intention of limiting the scope of the overall inventive idea. Naturally, there are very many different possible variations and modifications.

By way of illustration, the individual containers or even the entire storage system, which is composed of two roll storages and a forward transport mechanism, which form a rigid unit, can be provided with suitable extrusions in order that they can be stacked with other roll storage systems. Furthermore, the containers may also be stacking containers.

Moreover, a suitable numbering or coding (16) of the individual storage sites is possible. With a code reader in the timed forward transport area, any desired storage site can be reached with reverse operation.

The conveyor belt may also be composed of individual segments, which may be flexibly joined like hinges. In this manner substantially fixed storage sites can be attained and, on the other hand, storage capacity can be varied as desired.

Furthermore, the roll stretch may be set upside down in such a manner that the output point of the cover plate releases the item and gravity lets it fall from the storage site. In addition, the individual storage sites may be partitioned in transverse direction of the conveyor belt in any desired lattice dimension by means of transverse plates, which are stationary and/or can be stuck into grooves.

In any case, a unversially applicable storage system is attained, which requires only very rudimentary motions for loading and unloading and still has nearly 75% storage capacity of a square container.

What I claim is:

1. A storage system for sequent and positioned input, storage and removal of items on a conveyor belt (1), the ends of which are attached to shafts (31, 32) respectively, and which can be wound off together with the items thereon from one shaft and onto the other shaft by means of a forward transport unit in such a manner that one item at a time can be stored, and respectively be removed, at a loading and unloading station, a pair of containers (21, 22), said shafts (31, 32) being arranged with one of the shafts in a corresponding one of said containers, each of said containers being closed on all sides except for openings for said conveyor belt, said containers being connected to each other by means of a detachable connecting plate, whereby each of said containers can be removed from the storage system, said forward transport unit (43, 44, 46) being a synchronized forward transport unit, independent of said containers (21, 22).

2. A storage system according to claim 1 wherein said conveyor belt is designed in such a manner that it permits storing sequent and individual items.

3. A storage system according to claim 2, wherein said conveyor belt is provided with recesses or contours, the shape of which is adapted to the outline of the items to be stored standing broadside to the conveyor belt (FIG. 4).

4. A storage system according to claim 3, wherein said conveyor belt (1) is composed of an elastic belt carcass (11) and mounted modular props (12).

5. A storage system as set forth in claim 1 wherein at least one of said containers is capable of completely taking up the entirety to said conveyor belt.

6. A storage system according to claim 1, wherein said forward transport unit is provided with a timed forward transport element (43; 44; 46), having at least one meshing element, which, for transport, meshes into a complimentarily shaped element in the conveyor belt.

7. A storage system according to claim 6, wherein said meshing elements are pins (45; 49), which mesh into holes (13) in the conveyor belt.

8. A storage system according to claim 6 or 7, wherein a retractable meshing element is provided on a forward transport runner (43).

9. A storage system according to claim 6 or 7, wherein said meshing elements are provided on a drum (46), which can be turned.

10. A storage system according to claim 6, wherein additionally a locking element (45) is provided in the loading and unloading station area, which meshes into a complimentarily shaped element (13) in the conveyor belt during the loading and unloading process.

11. A storage system according to claim 1, wherein said conveyor belt is bent convex in the loading direction in the loading and unloading stations area.

12. A storage system according to claim 11, wherein said drum (46), which can be turned, bends said conveyor belt.

13. A storage system according to claim 1, wherein a cover (42; 48) is provided in the loading and unloading station area, which permits access to only one recess of said conveyor belt.

14. A storage system according to claim 1, wherein at least one auxiliary motor (6) turns the roll, which is being unwound in opposite direction of the roll direction, and/or the roll, which is being wound, in roll direction, in order to keep the roll taut.

15. A storage system according to claim 14, wherein each shaft (31; 32) is provided with an auxiliary motor (6).

16. A storage system according to claim 14, wherein a brake holds the roll, which is being unwound, taut.

17. A storage system according to claim 1, wherein roll-out bands (4) connect said conveyor belt to said shafts.

18. A storage system according to claim 1, wherein said shafts (31; 32) have a spiral-shaped cross-section in order to yield a rounder roll.

19. A storage system according to claim 1, wherein a metal guide sheet (2) is provided in the opening in said container, through which said conveyor belt is run, which prevents items from falling off after unwinding.

20. A storage system according to claim 1, wherein said conveyor belt is provided with a coding device (16).

* * * * *